United States Patent Office 2,890,239
Patented June 9, 1959

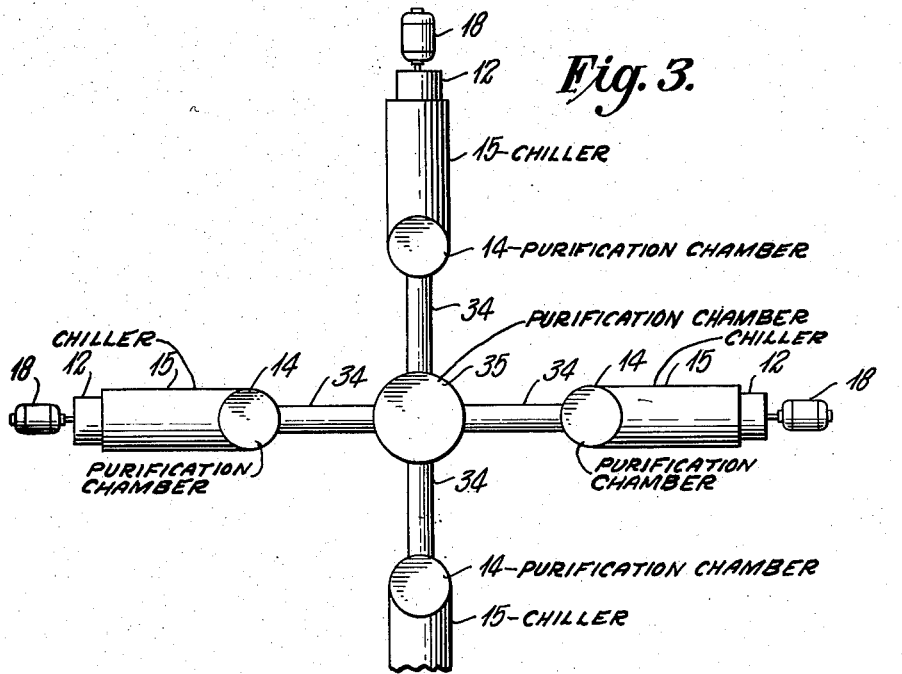
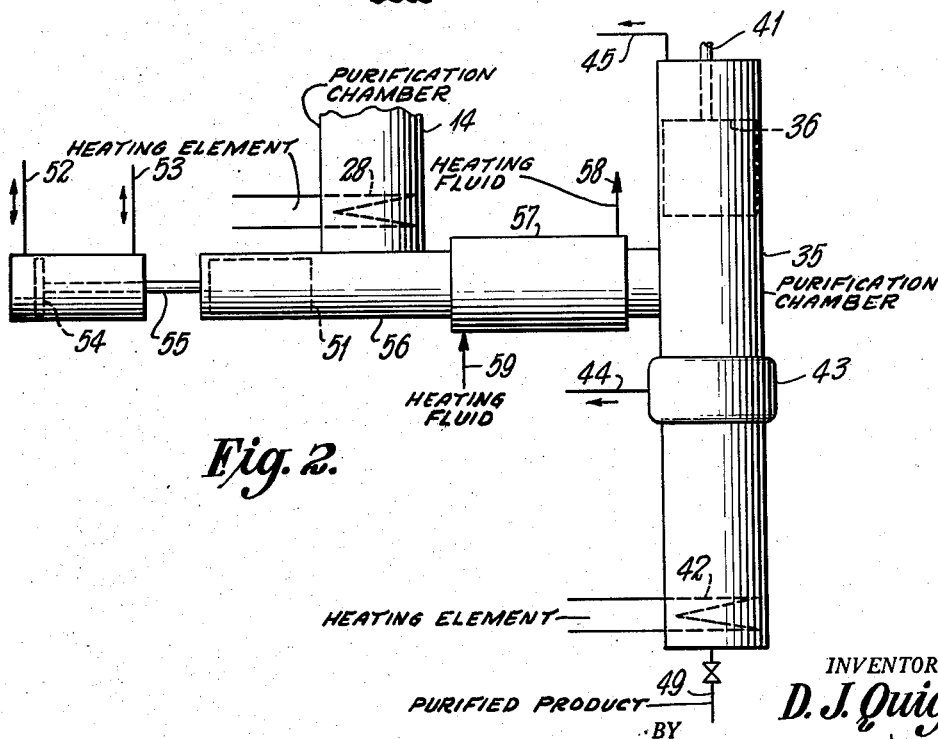

2,890,239

SEPARATION BY CRYSTALLIZATION

Donald J. Quigg, Bartlesville, Okla., assignor to Phillips Petroleum Company, a corporation of Delaware Application July 15, 1954, Serial No. 443,512

15 Claims. (Cl. 260—475)

This invention relates to separation by crystallization. In one of its more specific aspects, the invention relates to improved apparatus for the separation of components of mixtures by fractional crystallization. In another of its more specific aspects, the invention relates to an improved method for separating the components of mixtures by fractional crystallization.

Separations of compounds may be effected by distillation, solvent extraction and crystallization. Although distillation and extraction are generally preferred because of economy and convenience of operation, there are some instances in which such processes cannot be successfully utilized. Many chemical isomers have similar boiling points and solubilities and cannot be separated satisfactorily by distillation or extraction. Separation by means of fractional crystallization can be satisfactorily utilized in many cases in making such separations. Fractional crystallization has one great advantage over other methods of separation in that it is the only separation method which theoretically offers a pure product in a single stage of operation in systems in which the desired component of a mixture solidifies at a temperature above which the other components solidify. Thus, whereas distillation and extraction theoretically require infinite stages for a pure product, crystallization in many cases requires only one. This is because of phase equilibrium in distillation and extraction, while by crystallization, substantially pure crystals can be separated from many solutions in one stage, regardless of the liquid composition. Thus, whereas separation by distillation and extraction becomes more difficult as the purity of the product increases, separation by crystallization becomes easier.

Crystallization is thus well suited, not only to the separation of many chemical isomers which can be separated by no other means, but also to the purification of many compounds which cannot be economically purified by other means. Whereas one stage of crystallization theoretically offers a pure product, attainment of this ideal stage has been difficult. Complete removal of occluded impurities without substantial loss in yield is required. This invention results in a very close approach to the ideal crystallization stage.

A method of separating a pure component from a mixture has been devised whereby the mixture to be separated is introduced into a heat exchange zone wherein a slurry of crystals is formed and that slurry of crystals is then introduced into an elongated purification chamber through which the crystals are moved as a compact mass. As disclosed by J. Schmidt, Re. 23,810, the crystals are moved as a compact mass through the chamber to a melting zone wherein the crystals are melted. A portion of liquid corresponding to the melt is caused to move countercurrently through at least a portion of the crystal mass so as to displace occluded impurities from the crystal mass approaching the melting zone. The exact mechanism whereby this displaced liquid corresponding to the melt improves the purity of the final product is not completely understood. However, it is presently believed that the substantially pure material which is refluxed through at least a portion of the crystal mass displaces the mother liquor from the crystal mass approaching the melting zone and replaces the mother liquor in the interstices of the crystal mass. A high yield of product is obtained since the high melting product refreezes from the reflux stream as it comes in contact with the cold crystal mass moving toward the melting zone. Thus, the portion of the crystal mass which approaches the melting zone does not contain any appreciable amount of impurities and the resulting product which is removed from the melting zone is of extremely high purity.

In order to make some separations of the constituents of a liquid mixture by fractional crystallization, it is necessary to adjust the temperature of the mixture to one which is far below the solidification point of the pure desired constituent. For example, when para-xylene is separated from a mixture of isomeric alkyl benzenes, it is necessary to cool the mixture to a temperature in the neighborhood of about $-57°$ to about $-73°$ C., depending upon the concentration of the constituents in the mixture, in order to crystallize the paraxylene. When the crystals of para-xylene are introduced into a purification chamber wherein they are moved as a compact mass through the length of the column to a melt zone in a manner so as to displace a portion of the melt through at least a portion of the crystal mass, considerable difficulty is encountered. The substantially pure material obtained by melting crystals in the melt zone has, in many instances, such as in the case of para-xylene, a freezing point which is much higher than that of the desired material in admixture with the other liquid components. For example, pure para-xylene has a freezing point of about 13° C. When such a high freezing point material is displaced through at least a portion of a crystal mass which is at a temperature much lower than the freezing point of that material, that relatively pure material freezes in the interstices of the crystal mass to such an extent that it completely closes off further flow of the melt through the compacted crystal mass. I have devised a method whereby continuous operation can be achieved at a high rate without encountering freezing of a solid impervious crystal plug in the purification column. This problem is, to my knowledge, only encountered in a system using a purification tube, such as is described hereinafter. This improvement is particularly important, since it results in a convenient recovery of a product of high purity at a very high rate.

It is also highly desirable for the best operation of such a purification system to remove as much of the mother liquor from the crystals as possible before introducing those crystals into the purification chamber to be compacted. In this manner, many of the impurities can be eliminated from the purification system before subjecting the crystals to the final purification step.

I have devised a method whereby increased efficiency can be obtained in the production of a product which has 98+ percent purity and, in some cases, even as high as 99.9 percent purity, with very high continuous yields. The process is applicable to numerous multi-component systems.

The following are objects of the invention.

An object of the invention is to provide an improved system for the separation of a pure component from mixtures. Another object of the invention is to provide an improved process for the separation of a pure component from a mixture. Another object of the invention is to provide a method for rapidly separating a component having a relatively high solidification point from a liquid mixture which has a relatively low eutectic solidification point. Another object of the invention is to provide apparatus for rapidly separating a component having a relatively high freezing point from a liquid mixture which has a relatively low eutectic freezing point. Another object of the invention is to provide a process which will permit the continued displacement of pure material through at least a portion of a compacted crystal mass. Other and further objects of the invention will be apparent to those skilled in the art upon study of the accompanying disclosure.

Broadly speaking, this invention resides in a method and apparatus for purification of crystals wherein mother liquor is continuously removed from the crystals while heating the crystals so as to raise the temperature of the crystal mass which is introduced into the purification zone to a temperature considerably above the temperature to which the feed is cooled in the crystal forming step. The warmed crystals are then introduced into an elongated purification chamber wherein they are concentrated to ultimate purity.

The specific combined warming of the crystals and separation of the mother liquor from the crystals is obtained by means of a system wherein a first elongated purification chamber is modified so as to permit the removal of mother liquor from an upstream portion (with respect to crystal movement) thereof and the removal of a small amount of displaced melt from a downstream portion of the chamber and, in addition, the crystal mass is heated as it is moved into the final purification chamber.

Although, as I have pointed out hereinbefore, this invention is particularly applicable to systems in which the temperature at which crystals of the desired pure component form is considerably higher than the temperature to which the component is cooled in the liquid mixture to form crystals thereof, this procedure can be advantageously utilized in practically any system to which fractional crystallization is applicable so as to increase the efficiency of the process. This invention is applicable to the separations in many multi-component systems, the components of which have practically the same boiling point and are, therefore, difficult to separate by fractional distillation, or to mixtures which have diverse boiling points but which form azeotropes or are heat sensitive. The effective separation of components of such mixtures may be made from systems where the concentration of one component is relatively high, or where the concentrations of the components are about equal. One particular advantageous application of the process lies in the purification of a component of, say 15 to 25 percent purity, so as to effect a purity upwards of 98 percent. In order to illustrate some of the systems to which the invention is applicable, the following compounds are grouped with respect to their boiling points:

| Group A | B.P., °C. | F.P., °C. |
|---|---|---|
| Benzene | 80 | 5.5 |
| n-Hexane | 69 | −94 |
| n-Heptane | 98.52 | −90.5 |
| Carbon tetrachloride | 77 | −22.8 |
| Acrylonitrile | 79 | −82 |
| Ethyl alcohol | 78.5 | −117.3 |
| 2,2-Dimethylpentane | 79 | −125 |
| 3,3-Dimethylpentane | 86 | |
| Methyl ethyl ketone | 79.6 | −86.4 |
| Methyl propionate | 79.9 | −87.5 |
| Methyl acrylate | 80.5 | |
| 1,3-Cyclohexadiene | 80.5 | −98 |
| 2,4-Dimethylpentane | 80.8 | −123.4 |
| 2,2,3-Trimethylbutane | 80.9 | −25 |
| Cyclohexane | 81.4 | 6.5 |
| Acetonitrile | 82 | −42 |
| Cyclohexene | 83 | −103.7 |
| 2-Methylhexane | 90 | −119 |
| 3-Methylhexane | 89.4 | −119.4 |

| Group B | B.P., °C. | F.P., °C. |
|---|---|---|
| Methyl cyclohexane | 100.3 | −126.3 |
| Cyclohexane | 81.4 | 6.5 |
| n-Heptane | 98.52 | −90.5 |
| 2,2,4-Trimethylpentane (isooctane) | 99.3 | −107.4 |
| Nitromethane | 101 | −29 |
| p-Dioxane | 101.5 | 11.7 |
| 2-Pentanone | 101.7 | −77.8 |
| 2-Methyl-2-butanol | 101.8 | −11.9 |
| 2,3-Dimethylpentane | 89.4 | |
| 3-Ethylpentane | 93.3 | −94.5 |

| Group C | B.P., °C. | F.P., °C. |
|---|---|---|
| Toluene | 110.8 | −95 |
| Methylcyclohexane | 100.3 | −126.3 |
| 2,2,3,3-Tetramethyl butane | 106.8 | 104 |
| 2,5-Dimethylhexane | 108.25 | −91 |
| 2,4-Dimethylhexane | 110 | |
| 2,3-Dimethylhexane | 113.9 | |
| 3,4-Dimethylhexane | 116.5 | |
| 3-Ethyl-2-methylpentane | 114 | |
| 3-Ethyl-3-methylpentane | 119 | |

| Group D | B.P., °C. | F.P., °C. |
|---|---|---|
| Aniline | 184.4 | −6.2 |
| Toluene | 110.8 | −95 |
| Benzene | 80.0 | 5.5 |

| Group E | B.P., °C. | F.P., °C. |
|---|---|---|
| Carbon tetrachloride | 77 | −22.8 |
| Chloroform | 61 | −63.5 |
| CS₂ | 46.3 | −108.6 |
| Acetone | 56.5 | −95 |

| Group F | B.P., °C. | F.P., °C. |
|---|---|---|
| Ortho-xylene | 144 | −27.1 |
| Meta-xylene | 138.8 | −47.4 |
| Para-xylene | 138.5 | 13.2 |

| Group G | B.P., °C. | F.P., °C. |
|---|---|---|
| Ortho-cymene | 175.0 | −73.5 |
| Meta-cymene | 175.7 | >−25 |
| Para-cymene | 176.0 | −73.5 |

| Group H | B.P., °C. | M.P., °C. |
|---|---|---|
| Dimethyl phthalate | 282 | 5.5 |
| Dimethyl isophthalate | 124 | 67 |
| Dimethyl terephthalate | (12 mm.) 288 | 140.6 |

| Group I | B.P., °C. | M.P., °C. |
|---|---|---|
| Ortho-nitrotoluene | 222.3 | α−10.6 β−4.1 |
| Meta-nitrotoluene | 231 | 15.5 |
| Para-nitrotoluene | 238 | 51.3 |

Systems consisting of any combination of two or more of the components within any one of the groups may be separated by the process of the invention, as well as systems made up of components selected from different groups; for example, benzene may be separated from a benzene-, n-hexane or n-heptane system in which the benzene is present in an amount greater than the eutectic concentration. In the same manner, para-xylene may be readily separated from a mixture of para- and meta-xylenes or from para-, meta-, and ortho-xylenes. Benzene may also be separated from a mixture with toluene and/or aniline. Multi-component systems which may be effectively separated so as to recover one or more of the components in substantially pure form include 2,2-dimethylpentane, 2,4-dimethylpentane, 2,2,3-trimethylbutane, methyl cyclohexane, 2,2,4-trimethylpentane, and carbon tetrachloride, chloroform, and acetone. The invention is also applicable to the separation of individual components from a system of cymenes and a system including the xylenes.

This invention can also be utilized to purify naphthalene, hydroquinone, (1,4-benzenediol), paracresol, paradichlorobenzene, and such materials as high melting waxes, fatty acids, and high molecular weight normal paraffins. The system can also be used to separate anthracene, phenanthrene, and carbazole. Furthermore, the system can be used to separate durene (1,2,4,5-tetramethylbenzene) from $C_{10}$ aromatics. In cases where the material to be purified has a relatively high crystallization point, the impure material is raised to a temperature at which only a portion of the constituents are in a crystalline state and the resulting slurry is handled at such a temperature that operation is as described in connection with materials which crystallize at lower temperatures.

The invention is also applicable to the concentration of food products. In the preparation of such concentrated foods, the process consists generally of the removal of water from such products. One special class of foods which can be concentrated in this manner is that of fruit juices, such as grape, pineapple, watermelon, apple, orange, lemon, lime, tangerine, grapefruit, and the like. Beverages, such as milk, wine, beer, coffee, tea, and various liquors, can also be concentrated in such a process. The process is also applicable to the concentration of vegetable juices.

A more complete understanding of this invention will be obtained on study of the accompanying drawings, in which:

Figure 2 is a section view of a modified system of this invention; and

Figure 3 is a plan view of a modification of the system of this invention.

Figure 1:
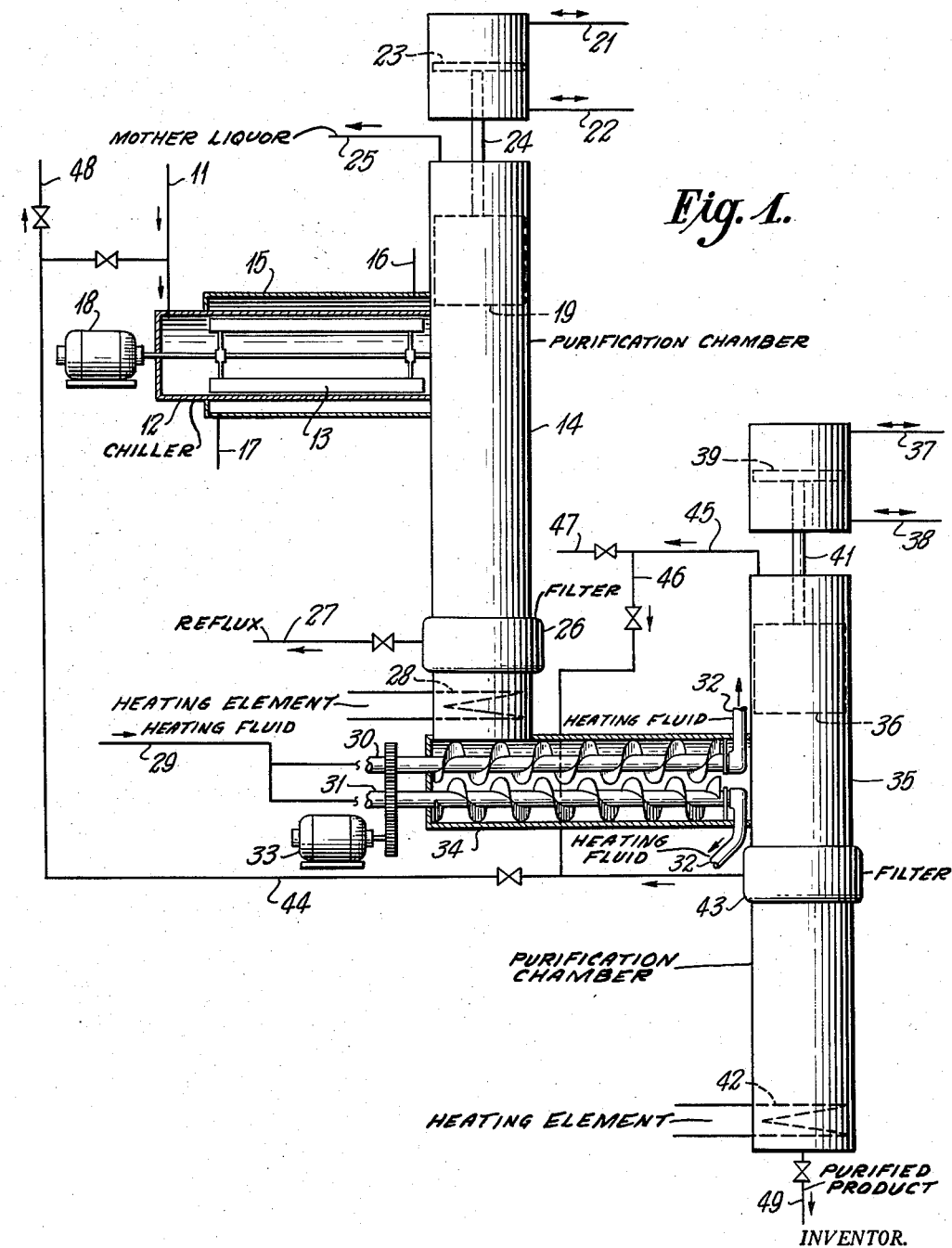
Figure 1 is an elevation of the fractional crystallization system of this invention.

Referring particularly to Figure 1 of the drawings, a mixture of materials from which at least one constituent is to be separated is fed through conduit 11 to a heat exchanger, such as chiller 12, where the temperature of the mixture is adjusted so as to obtain crystals of at least a portion of at least one of the constituents of the mixture. Chiller 12 can be any conventional type chiller, preferably being of the scraped surface type which is supplied with refrigeration means that are adequate to lower the temperature of the liquid mixture to that necessary to crystallize at least a portion of at least one of the constituents thereof. It is preferred that the scraper 13 in chiller 12 be formed as a helix so as to aid in moving the crystals from the chiller into elongated tube or chamber 14. Chiller 12 is, as shown in this drawing, provided with a heat exchange jacket 15 through which cooling fluid is passed by means of conduits 16 and 17. Although this chiller is shown as extending at right angles from chamber 14, it is, in some instances, desirable to position the chiller at an angle so that the crystals are permitted to move by gravity into an upstream portion of chamber 14. Scraper 13 is rotated at the desired speed by means of motor 18. As will be apparent from the discussion hereinbefore, the temperature to which the mixture is adjusted in the heat exchanger will depend entirely upon the specific mixture, since the various materials have different solidification points and the solidification point of any given constituent in a mixture is dependent upon the constitution of the mixture. When a mixture of isomeric $C_8$ alkyl benzenes is fed through conduit 11 to chiller 12, that mixture is cooled to a temperature in the neighborhood of −57° to −73° C. When the desired product is relatively dilute in the feed stream, the temperature at which crystals will form will be relatively low. If the desired product is relatively concentrated in the feed, the temperature at which crystals will form will be relatively high.

The slurry resulting from the chilling of the liquid mixture is fed into chamber 14 wherein the crystals are moved as a compact mass in elongated chamber 14 by means of piston 19 which is driven by means of fluid flow through conduits 21 and 22, which fluid acts upon drive piston 23 connected to piston 19 by means of piston rod 24. Piston 19 is preferably of the type which has a porous face to permit the passage of liquid therethrough while preventing the passage of crystals. Thus, as piston 19 is moved in a downstream direction so as to move the compacted crystal mass downstream through chamber 14, uncrystallized material (mother liquor) is permitted to flow through the face of piston 19 and is removed from the upstream portion of chamber 14 through conduit 25. This material can be reprocessed, for example, in a system for the production of para-xylene, the mother liquor can be isomerized so as to form additional para-xylene in the feed which is once again supplied to the system through conduit 11.

Piston 19 may, if desired, be an imperforate piston, in which case it is necessary to provide separate means for removing mother liquor from an upstream end portion of chamber 14. In such an event, it is preferred that a filter be provided at a point immediately downstream of chiller 12. The compact crystal mass which is moved downstream through chamber 14 by means of piston 19 is at a relatively low temperature. For this reason, it is necessary to remove melted material from the system before it has an opportunity to be displaced any great distance into the compart crystal mass, for the melt does not itself carry a sufficient amount of heat to heat the crystal mass sufficiently to keep the melt from concentrating and freezing on a given cross-section. Thus, filter 26 is provided in a downstream portion of chamber 14 removed but a matter of a few inches, preferably from 4 to 14 inches, from the melt zone and conduit 27, having a flow control valve therein, is adapted for the removal of reflux material from that filter. Heating element 28 is provided in a downstream portion of chamber 14 for heating the crystals and melting a portion thereof in the downstream end of that chamber. Heating element 28, although shown as a heating coil through which the heating material may be passed, may be any conventional means for heating, such as a heating chamber or element wrapped around or enclosing a portion of the lower end of chamber 14 or may be an electrical heating element provided within the downstream portion of that chamber.

In this particular system, I utilize a conveyor 34 which utilizes at least one hollow helical element. In the instant drawing, the conveyor is made up of two helical elements through which heated material is passed through conduit 29. Conduit 29 is connected to the hollow shafts 30 and 31 of the conveyor elements and the heated fluid is removed from the downstream end portion of those conveyor elements through conduit 32. The conveyor elements are driven by motor 33.

By utilizing this system, it will be seen that I eliminate a major portion of impurities in the form of mother liquor from an upstream portion of chamber 14. A preliminary purification is obtained in this system by displacing a portion of melted material upwardly through a short section of the crystal mass as it is moved downstream toward the heated zone associated with heating element 28. This material, which has the preliminary purification, is further heated in conveyor 34 so as to provide a feed to elongated purification tube or chamber 35 which has between 35 and 45 percent solids. The crystals which are introduced into chamber 35 are compacted by means of piston 36 which, like piston 19, is moved by the flow of fluid through conduits 37 and 38 to move motivating piston 39, which is connected to piston 36 by means of piston rod 41. Piston 36 is preferably of a perforate type, the face thereof being sufficiently perforate to permit the flow of liquid therethrough while preventing the passage of crystalline material therethrough. The crystals which are introduced into chamber 35 are compacted by means of piston 36 and are moved in a downstream direction through chamber 35 toward a heating zone associated with heating element 42. Heating element 42, as discussed in connection with heating element 28, may be any type of heating element which will uniformly heat the crystals in the downstream portion of chamber 35 so as to melt at least a portion thereof.

A portion of the melted crystals is displaced countercurrently through at least a portion of the compact crystal mass, which displaced impurities are removed from chamber 35 through filter 43 and conduit 44. Liquid material which is permitted to pass through the face of piston 36 is removed from the upstream portion of chamber 35 through conduit 45. When the operation of this system is such that the liquid which is removed through conduit 45 has at least a concentration of the desired product of the system higher than that of the feed introduced through conduit 11, that material is passed through conduit 46 to conduit 44 and the stream from conduit 44 is then introduced into chiller 12. In this manner, the feed to chiller 12 is materially enriched, in the desired component, and crystals which are much larger than would otherwise be possible are obtained during the crystallization step.

When the stream removed through conduit 45 does not have a sufficiently high concentration of the desired component, that stream is removed through conduit 47. A similar disposition is made of the liquid removed through filter 43 and conduit 44 if that stream does not contain a sufficient concentration of the desired component. In such a situation, that stream is removed through conduit 48. In some instances, it is desirable to utilize an imperforate piston as piston 36. When such a piston is utilized, the total liquid displaced from the crystal mass is removed from chamber 35 through filter 43 and conduit 44.

Purified product is removed from the downstream portion of chamber 35 through conduit 49. Although the product is most conveniently removed as completely melted material, it is possible to remove the product as a slurry of crystals in melt.

Referring particularly to Figure 2 of the drawings, parts like those discussed in connection with Figure 1 of the drawings are designated by like numerals. This system utilizes different means for moving crystals from a downstream portion of chamber 14 into an upstream portion of chamber 35. In this system, a piston 51 is moved by means of fluid flow through conduits 52 and 53, acting upon motivating piston 54 which is connected to piston 51 through piston rod 55. Piston 51 is moved across a downstream portion of chamber 14, carrying a slug of crystalline material before it into conduit 56, which conduit is provided with a heating jacket 57 through which heated material is circulated by means of conduits 58 and 59. The functions of the other elements of the system shown are discussed in connection with Figure 1 of the drawings.

By operating with the system shown and discussed in connection with Figures 1 and 2 of the drawings, the temperature of the crystalline material is raised so that as it is moved in a downstream direction through chamber 35 so as to displace a portion of melted material countercurrently through the crystal mass, no undue freezing of the melt is encountered so that the crystal mass becomes impervious to further liquid movement therethrough. With this problem removed from the system, I am able to utilize a purification chamber of larger volume than has heretofore been considered. Thus, as I have indicated in Figure 3 of the drawings, that purification chamber 35 is of larger diameter than the plurality of chambers 14 which are connected to an upstream portion of chamber 35. Thus, the removal of mother liquor and preliminary purification which is obtained in the very short downstream section of chamber 14 can be obtained at a relatively slow rate so that undue freezing of liquid in the interstices of the crystal plugs maintained therein is avoided. Yet, by utilizing a plurality of chambers 14, a sufficient supply of crystalline material is provided to purification chamber 35 to permit the recovery of pure product at a very high rate.

In order to better illustrate my invention, I have provided the following example which is intended to exemplify rather than to unduly limit the invention.

*Example*

A feed stream comprising a mixture of isomeric alkyl benzenes containing approximately 17 percent by weight para-xylene, together with ortho-, and meta-xylene, ethyl benzene, and other aromatic hydrocarbons, is fed into scraped surface chiller 12 through conduit 11 at a rate of 1,000 gallons per hour. Liquid material removed as displaced liquid from chamber 35 through filter 43 comprises 53 percent para-xylene. This stream is supplied to chiller 12 at 165 gallons per hour, together with the feed stream described hereinabove. The resulting composite feed comprises 22.1 percent para-xylene in admixture with 16.3 percent ortho-xylene, 31 percent meta-xylene, 26.2 percent ethyl benzene, and 4.4 percent toluene at 1,165 gallons per hour. That material is lowered to a temperature of $-76°$ C. with the resultant formation of 15.1 percent solids. The slurry of mother liquor and crystals is introduced into elongated chamber 14 wherein mother liquor having a para-xylene content of 6.75 percent is removed through conduit 25 at a rate of 875 gallons per hour. The crystal material from which the mother liquor has been removed is 70 percent solids and is at a temperature of about $-76°$ C. As that material is compressed and moved through chamber 14 by piston 19, the downstream portion of the compressed crystal mass is heated so as to melt a portion of the crystals. A portion of the melt is displaced countercurrently through a very short length of the crystal mass and is removed through filter 26 and conduit 27. As the crystal mass is forced into the downstream end portion of chamber 14, the conveyors in conduit 34 pick up the crystals and convey them toward chamber 35. The crystals are additionally heated during their travel through conduit 34 to a temperature of about $-23°$ C. and a stream of 40 percent solids at that temperature is moved to purification chamber 35 at a rate of 275 gallons per hour. The crystals are compacted in chamber 35 and are moved as a compact mass downstream to the heating zone wherein the crystals are melted and a portion of the melt is displaced upstream through the compact crystal mass. A product which is about 99 percent para-xylene is removed through conduit 49 at a rate of about 110 gallons per hour.

It will be apparent to those skilled in the art that various modifications of this invention can be made upon studying the accompanying disclosure. Such modifications are believed to be clearly within the spirit and the scope of this invention.

I claim:

1. A process for concentrating a compound which exists in admixture with other materials and is separable therefrom by crystallization which comprises cooling said admixture to a temperature at which said compound crystallizes therefrom, recovering crystals of said compound, introducing crystals of said compound to a first elongated purification zone, moving said crystals toward one end of said zone as a compact mass, melting a portion of said compact crystal mass in a downstream portion (with respect to crystal movement) of said zone, displacing a portion of the resulting melt countercurrently through a length of said crystal mass sufficient to displace occluded impurities therefrom but insufficient to reduce the temperature of the melt to the point where freezing of the melt in the interstices of the crystals to form an impenetratable mass occurs, removing said displaced materials from said first elongated zone, heating said crystals to melt a portion thereof and raise the temperature of the crystal mass to a temperature substantially above the temperature to which the admixture is cooled in the crystal forming step, introducing crystals of said heated material into an upstream portion (with respect to crystal movement) of a second elongated purification zone, moving said crystals toward one end of said zone as a compact mass; melting at least a portion of said compact crystal mass in a downstream portion (with respect to crystal movement) of said purification zone; displacing a portion of resulting melt countercurrently through at least a portion of the length of said crystal mass so as to displace occluded impurities therefrom; removing displaced liquid from an upstream portion (with respect to crystal movement) of said second purification zone; and removing a purified product from the downstream end portion of said purification zone.

2. A process for the purification of crystals which comprises compacting said crystals in a first elongated zone; moving said crystals toward one end of said zone as a compact mass; melting a portion of said compact crystal mass in a downstream portion (with respect to crystal movement) of said zone; displacing a portion of the resulting melt countercurrently through a length of said crystal mass sufficient to displace occluded impurities therefrom but insufficient to reduce the temperature of the melt to the point where freezing of the melt in the interstices of the crystals to form an impenetrable mass occurs thereafter removing said displaced materials from said first elongated zone; heating said crystals sufficiently to raise the temperature of said crystals to form a melt having a solids content of not more than 45 percent by weight; introducing crystals of said heated material into an upstream portion (with respect to crystal movement) of a second elongated purification zone at a temperature at which a portion of said crystals is melted; moving said crystals toward one end of said zone as a compact mass; melting at least a portion of said compact crystal mass in a downstream portion (with respect to crystal movement) of said purification zone; displacing a portion of resulting melt countercurrently through at least a portion of the length of said crystal mass so as to displace occluded impurities therefrom; removing displaced liquid from an upstream portion (with respect to crystal movement) of said second purification zone; and removing a purified product from the downstream end portion of said purification zone.

3. A process for the separation and purification of at least one of the components of a mixture which comprises adjusting the temperature of said mixture to one at which one but not all of said components is in crystalline form; introducing resulting crystalline and non-crystalline material into a first elongated zone; moving said crystalline material toward one end of said zone as a compact mass; melting a portion of said compact crystalline mass in a downstream portion (with respect to crystal movement) of said zone; displacing a portion of the resulting melt countercurrently through a length of said crystal mass sufficient to displace occluded impurities therefrom but insufficient to reduce the temperature of the melt to a point where freezing of the melt in the interstices of the crystals to form an impenetrable mass occurs; thereafter removing said displaced materials from said first elongated zone; heating said crystals sufficiently to raise the temperature of said crystals to form a melt having a solids content of not more than 45 percent by weight; introducing crystals of said heated material into an upstream portion (with respect to crystal movement) of a second elongated purification zone at a temperature at which a portion of said crystals is melted; moving said crystals toward one end of said zone as a compact mass; melting at least a portion of said compact crystal mass in a downstream portion (with respect to crystal movement) of said purification zone; displacing a portion of resulting melt countercurrently through at least a portion of the length of said crystal mass so as to displace occluded impurities therefrom; removing displaced liquid from an upstream portion (with respect to crystal movement) of said second purification zone; and removing a purified product from the downstream portion of said purification zone.

4. The process of claim 3 wherein said mixture comprises para- and meta-xylenes, and at least one of said xylenes is recovered as a product.

5. The process of claim 3 wherein said mixture comprises dimethyl isophthalate and dimethyl terephthalate, and at least one of the said dimethylphthalates is recovered as a product.

6. The process of claim 3 wherein said mixture comprises para- and meta-cymenes, and at least one of said cymenes is recovered as a product.

7. The process of claim 3 wherein said mixture comprises para- and meta-nitrotoluenes, at least one of said nitro toluenes is recovered as a product.

8. The process of claim 3 wherein said mixture comprises cyclohexane and 2,2-dimethylpentane, and at least one of these hydrocarbons is recovered as a product.

9. A process for the separation and purification of at least one of the components of a mixture which comprises adjusting the temperature of said mixture to one at which at least one but not all of said components are crystalline; introducing resulting crystalline and non-crystalline material into an upstream portion of a first elongated zone; moving said crystals toward one end of said zone as a compact mass; melting a portion of said compact crystal mass in a downstream portion (with respect to crystal movement) of said zone; displacing a portion of the resulting melt countercurrently through a length of said crystal mass sufficient to displace occluded impurities therefrom but insufficient to reduce the temperature of the melt to the point where freezing of the melt in the interstices of the crystal mass to form an impenetrable mass occurs; thereafter removing said displaced materials from said first elongated zone; heating said crystals in the downstream portion of said first elongated zone and while transporting said crystals from said zone; sufficiently to raise the temperature of said crystals to form a melt having a solids content of not more than 45 percent by weight; introducing crystals of said heated material into an upstream portion (with respect to crystal movement) of a second elongated purification zone at a temperature at which a portion of said crystals is melted; moving said crystals toward one end of said zone as a compact mass; melting at least a portion of said compact crystal mass in a downstream portion (with respect to crystal movement) of said purification zone; displacing a portion of resulting melt countercurrently through at least a portion of the length of said crystal mass so as to displace occluded impurities therefrom; removing displaced liquid from an upstream portion (with respect to crystal movement) of said second purification zone, said displaced liquid having a concentration of the desired component greater than that in said mixture; readjusting the temperature of said displaced material so as to recrystallize at least said component of said displaced liquid corresponding to said purified product; subjecting said crystallized material to the steps enumerated above; and removing a purified product from the downstream portion of said purification zone.

10. Apparatus for crystal purification which comprises a first closed elongated tube; a heat exchanger for adjusting the temperature of a mixture to form a slurry of crystals in liquid, adjacent an inlet to an upstream portion of said first tube; crystal moving means in the upstream portion of said tube; means for withdrawing liquid from an upstream portion of said tube; heating means positioned at a downstream portion of said first tube; liquid outlet means in said downstream portion of said first tube adjacent and spaced upstream of said heating means; a second closed elongated tube; conduit means connecting a downstream portion of said first tube to an upstream portion of said second tube; means for moving crystals through said conduit means from said first tube to said second tube; means for heating said crystals while they are conveyed from said first tube to said second tube; liquid outlet means from an upstream portion of said second tube; crystal moving means in the upstream portion of said second tube; heating means positioned at a downstream portion of said second tube; and purified product outlet means in a downstream portion of said second tube.

11. Apparatus for crystal purification which comprises a first closed elongated tube; a heat exchanger for adjusting the temperature of a mixture to form a slurry of crystals in liquid, adjacent an inlet to an upstream portion of said first tube; crystal moving means in the upstream portion of said tube, adapted to permit the flow of liquid therethrough but to prevent the movement of crystals therethrough; means for withdrawing liquid which passes through said compacting means from said tube; heating means positioned at a downstream portion of said first tube; liquid outlet means in said downstream portion of said first tube adjacent and spaced upstream of said heating means; a second closed elongated tube; conduit means connecting a downstream portion of said first tube to an upstream portion of said second tube; means for moving crystals through said conduit means from said first tube to said second tube; means for heating said crystals while they are conveyed from said first tube to said second tube; liquid outlet means from said second tube downstream of said conduit means; crystal moving means in the upstream portion of said second tube; heating means positioned at a downstream portion of said second tube; and purified product outlet means in a downstream portion of said second tube.

12. Apparatus for crystal purification which comprises a first closed elongated tube; a heat exchanger for adjusting the temperature of a mixture to form a slurry of crystals in liquid, adjacent an inlet to an upstream portion of said first tube; crystal moving means in the upstream portion of said tube; means for withdrawing liquid from an upstream portion of said tube; heating means positioned at a downstream portion of said first tube; liquid outlet means in said downstream portion of said first tube spaced upstream adjacent said first heat exchange means; a second closed elongated tube; conduit means connecting a downstream portion of said first tube to an upstream portion of said second tube; helical conveyor means extending across the downstream portion of said first tube and through a substantial length of said conduit means connecting said tubes, said helical conveyor means being adapted for the passage of heating fluid therethrough; liquid outlet means from an upstream portion of said second tube; crystal moving means in the upstream portion of said second tube; heating means positioned at a downstream portion of said second tube; and purified product outlet means in a downstream portion of said second tube.

13. Apparatus for crystal purification which comprises a first closed elongated tube; a heat exchanger for adjusting the temperature of a mixture to form a slurry of crystals in liquid, adjacent an inlet to an upstream portion of said first tube; crystal moving means in the upstream portion of said tube; means for withdrawing liquid from an upstream portion of said tube; heating means positioned at a downstream portion of said first tube; liquid outlet means in said downstream portion of said first tube spaced upstream adjacent said first heat exchange means; a second closed elongated tube; conduit means connecting a downstream portion of said first tube to an upstream portion of said second tube; a piston housing connected to the downstream portion of said first tube and coaxially disposed with respect to said conduit means connecting said first and second tubes; a piston slidably fitted in said piston housing means and extendable across said first tube to said conduit means; means for heating said conduit means intermediate said first and second tubes; liquid outlet means from an upstream portion of said second tube; crystal moving means in the upstream portion of said first tube; heating means positioned at a downstream portion of said second tube; and purified product outlet means in a downstream portion of said second tube.

14. Apparatus for crystal purification which comprises a first closed elongated tube; a heat exchanger for adjusting the temperature of a mixture to form a slurry of crystals in liquid, adjacent an inlet to an upstream portion of said first tube; crystal moving means in the upstream portion of said tube; means for withdrawing liquid from an upstream portion of said first tube; heating means positioned at a downstream portion of said first tube; liquid outlet means in said downstream portion of said first tube spaced between 4 and 14 inches upstream of said heating means; a second closed elongated tube; conduit means connecting a downstream portion of said first tube to an upstream portion of said second tube; means for moving crystals through said conduit means from said first tube to said second tube; means for heating said crystals while they are conveyed from said first tube to said second tube; liquid outlet means from an upstream portion of said second tube; crystal moving means in the upstream portion of said second tube; heating means positioned at a downstream portion of said second tube; and purified product outlet means in a downstream portion of said second tube.

15. The apparatus of claim 14 wherein a plurality of said first tubes is connected to an upstream portion of said second tube which is of a larger diameter than the diameter of said first tubes.

References Cited in the file of this patent

UNITED STATES PATENTS

| | | |
|---|---|---|
| 2,540,977 | Arnold | Feb. 6, 1951 |
| 2,617,273 | Findlay | Nov. 11, 1952 |
| 2,683,178 | Findlay | July 6, 1954 |
| 2,747,001 | Weedman | May 22, 1956 |
| 2,751,890 | Rush | June 26, 1956 |

UNITED STATES PATENT OFFICE
CERTIFICATE OF CORRECTION

Patent No. 2,890,239                      June 9, 1959

Donald J. Quigg

It is hereby certified that error appears in the printed specification of the above numbered patent requiring correction and that the said Letters Patent should read as corrected below.

Column 6, line 32, for "compart" read -- compact --; column 9, line 56, before "one" insert -- at least --.

Signed and sealed this 23rd day of February 1960.

(SEAL)
Attest:

KARL H. AXLINE
Attesting Officer

ROBERT C. WATSON
Commissioner of Patents